United States Patent [19]

Hatchett

[11] 4,208,681
[45] Jun. 17, 1980

[54] CARTRIDGE TYPE RECORD PLAYER HAVING A THREE POSITION HOLDER

[75] Inventor: Michael R. Hatchett, Tucson, Ariz.

[73] Assignee: International Business Machines Corporation, Armonk, N.Y.

[21] Appl. No.: 967,817

[22] Filed: Dec. 8, 1978

[30] Foreign Application Priority Data

Dec. 23, 1977 [GB] United Kingdom ............... 53646/77

[51] Int. Cl.$^2$ ....................... G11B 17/02; G11B 15/18
[52] U.S. Cl. .................................... 360/97; 360/96.6; 360/93
[58] Field of Search .................. 360/97, 99, 96.5, 96.6, 360/93

[56] References Cited

U.S. PATENT DOCUMENTS 3,770,908  11/1973  Craggs .................................. 360/97
3,870,247  3/1975  Carisey ................................ 360/96.6

Primary Examiner—Robert S. Tupper
Attorney, Agent, or Firm—Herbert F. Somermeyer

[57] ABSTRACT

A disk, tape, etc. record member is contained in a cartridge or cassette. A cartridge type record player has a movable receptacle for receiving the cartridge. The receptacle has two stable and one momentary positions. A center stable position is a load position wherein the cartridge can be inserted into the receptacle. A second stable position, on one side of the center position, is a play position wherein a transducer is in operative association with the second member. The third and momentary position on a second side of the center stable position causes a spontaneous ejection of the cartridge from the receptacle. Usually, from the eject position, the receptacle returns to the center stable position.

8 Claims, 5 Drawing Figures

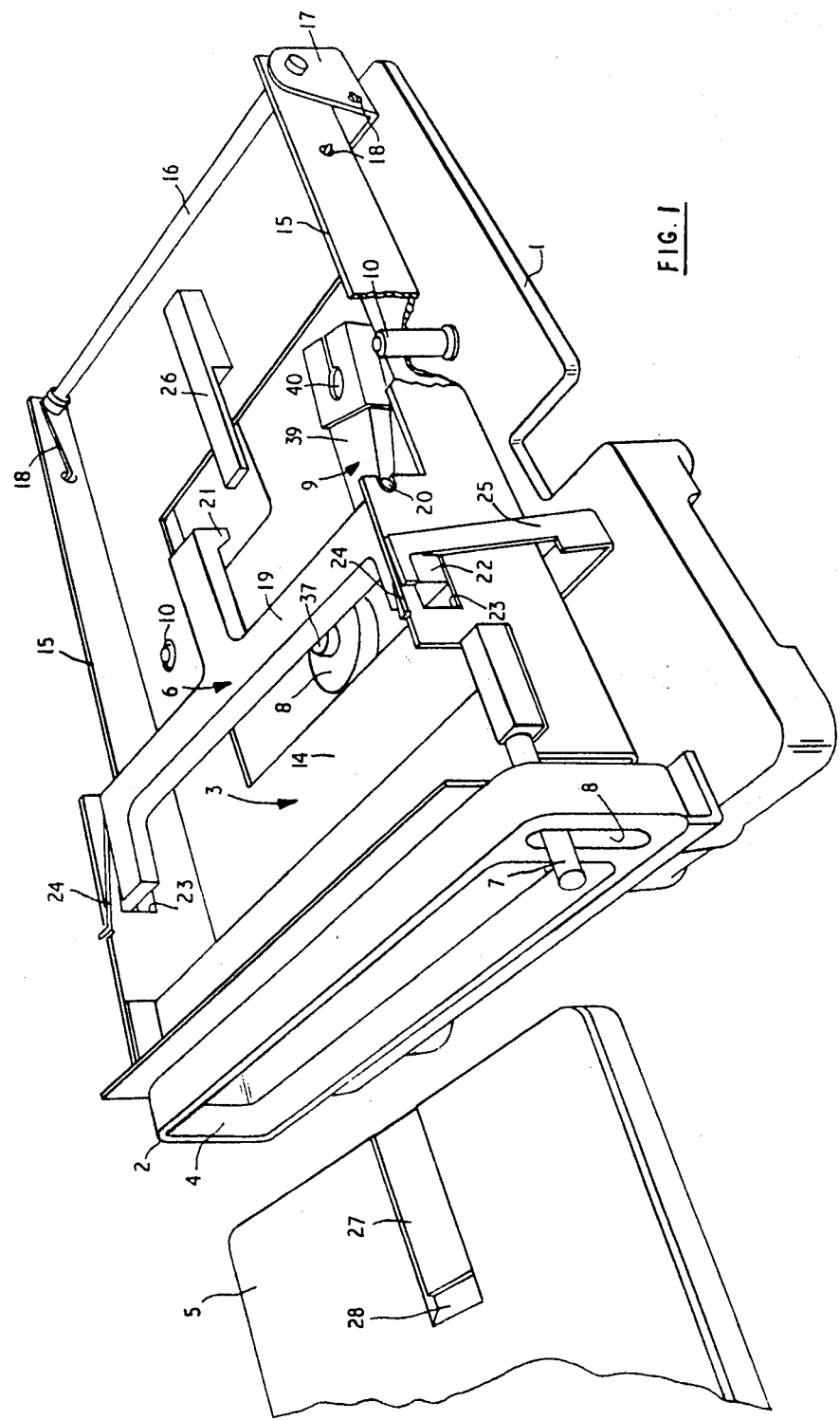

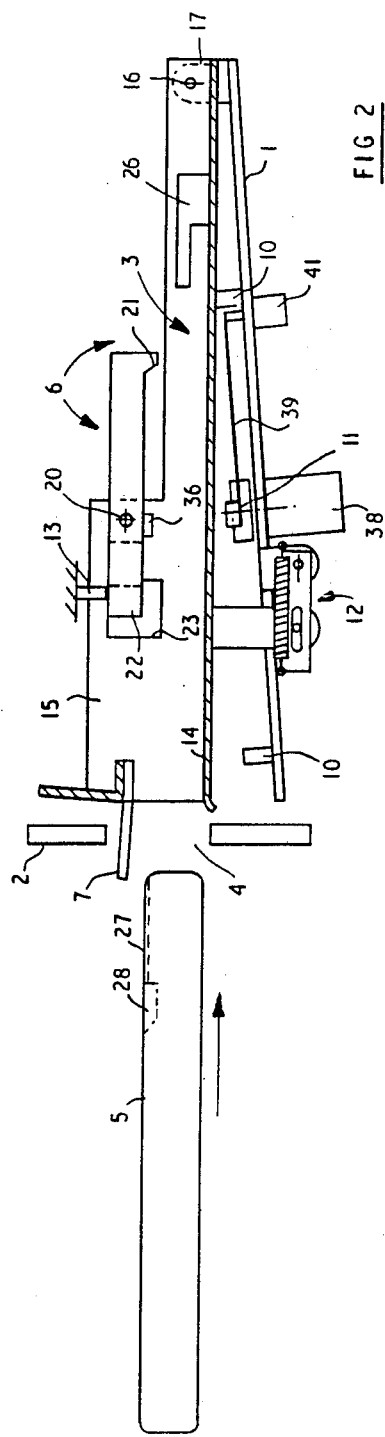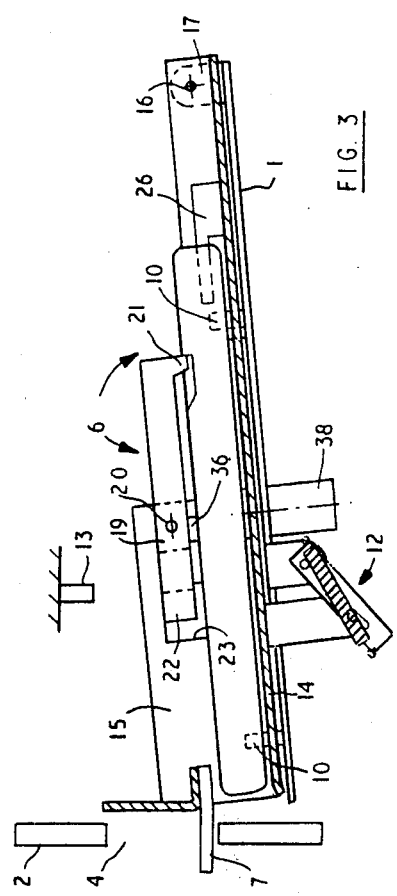

CARTRIDGE TYPE RECORD PLAYER HAVING A THREE POSITION HOLDER

BACKGROUND OF THE INVENTION

The invention relates to record medium containing apparatus, particularly to the receipt and ejection aspects of such apparatus.

Random access disk stores employing disk type record members often employ a disk assembly of one or more rigid magnetically coated disks which can be mounted on or in disk record/playback apparatus for recording and playback of data from the disk surfaces. Often the disks are contained within a cartridge to facilitate handling and storage and to protect the surfaces of the disks during installation and removal from the apparatus. Such cartridges are designed to prevent human contact with the disk surfaces and to seal the disk assembly from airborne contaminants. Provision is made to allow the necessary connections to be made with the record/playback apparatus including the introduction of one or more transducers into close proximity to the disk surfaces and the attachment of the disk hub assembly within the cartridge to a drive motor for rotation of the disk or disks. Similar arrangements are found with respect to tape type record members.

Development of flexible recording material has lead to the development of flexible disk cartridges as well as to flexible tape containing cartridges for installation on record/playback apparatus containing appropriate drive motors and head actuator mechanisms. An advantage of using flexible disks over flexible tapes and rigid disks is that in operation, the disk flies over the head supported on an air bearing generated as a result of the relative motion therebetween. Accordingly, a simple non-compliant head assembly is all that is required in a flexible disk drive in place of the complex and relatively expensive suspension unit required for rigid disks.

SUMMARY OF THE INVENTION

The present invention is concerned with apparatus for receiving such interchangeable cartridges. The apparatus should be simple to operate yet ensure that record member containing cartridges are located with precision within the apparatus so that the required head to record member relationship is established to enable successful record/playback operations to be performed.

According to the invention, a record member containing record/playback apparatus comprises a housing containing a drive motor, a receptacle for receiving a cartridge containing a record/playback member, the receptacle being movable between a cartridge loading position and a cartridge record/playback position, retaining means carried by said receptacle for engaging and retaining a cartridge inserted therein, locating means for contacting a cartridge retained in said receptacle as it is moved toward said record/playback position for locating said cartridge at a record/playback station with its contained record member connected for movement by said drive motor, clamping means operable on movement of said receptacle into said record/playback position to engage said cartridge and clamp it against said locating means and an eject position adjacent said loading position and reached by moving the receptacle further away from said playing position.

In order that the invention may be fully understood, a preferred embodiment thereof will now be described, by way of example, with reference to the accompanying drawings.

THE DRAWINGS

FIG. 1 is a perspective view from the side of one form of disk cartridge record/playback apparatus according to the invention;

FIG. 2 is a transverse sectional view of the apparatus in its 'open' condition ready to receive a disk cartridge;

FIG. 3 is a transverse sectional view of the apparatus in its 'closed' position with a loaded cartridge enclosed located at a record/playback station within the apparatus;

DETAILED DESCRIPTION

Figure 4A:
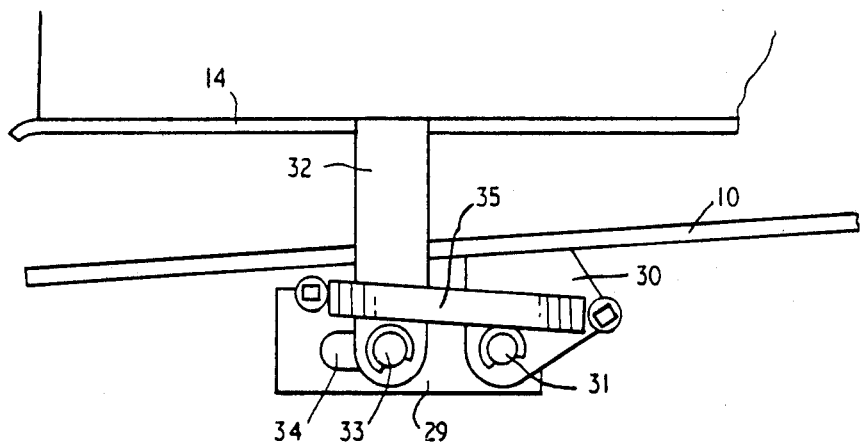
FIG. 4a shows an over-center toggle mechanism maintaining the apparatus at its open position as shown in FIG. 2.

Referring to the figures, cartridge record/playback apparatus according to the invention generally comprises a housing, part of which is shown as base plate 1 and front panel 2, containing a cartridge receptacle 3. The receptacle is hinged within the housing at its rear end to be movable from a cartridge loading position, shown in FIG. 1 and FIG. 2, to a cartridge record/playback position shown in FIG. 3. A horizontal slot 4 is provided in the front panel 2 to permit insertion of a disk cartridge 5 into the receptacle 3. A latch mechanism 6 carried by the receptacle is positioned to engage a cartridge 5 inserted into the receptacle and retains it therein against spring pressure until it is subsequently released. An operating lever 7 projects from the front of the receptacle through a vertical slot 8 in the front panel 2 to enable an operator to move the receptacle 3 up and down about its rear hinge between the loading and record/playback positions.

A disk drive magnetic chuck 8 and a record/playback head assembly 9 are supported above the base platen 1 in the vicinity of the record/playback position. Locating pins 10 extend from the base plate 1 into the receptacle 3 and are positioned to enter correspondingly positioned apertures in the base of the cartridge as it is moved by an operator toward the record/playback position. The pins and cartridge apertures are arranged so as to support and accurately locate the cartridge at a record/playback station where the enclosed disk is connected for rotation to the drive chuck 8, and a record/playback head 11 (FIG. 2) carried by the assembly 9 projects through an aperture in the cartridge in order to access the enclosed disk. The receptacle 3 continues its movement toward its record/playback position leaving the cartridge held supported and accurately positioned on the pins 10 at the record/playback station. The receptacle movement ceases when a clamp carried by the upper part of the receptacle contacts the upper surface of the cartridge and firmly clamps it on the pins 10 at the record/playback station. Since the cartridge is now independently supported at the record/playback station, it is buffered to a large extent from mechanical shocks and disturbances received by the cartridge receptacle 3 which could lead to record or playback errors. A door or shield, carried by the cartridge receptacle covers the slot when the receptacle is in the record/playback position as shown in FIG. 3.

An over-center toggle-action spring mechanism 12, to be described fully later with reference to FIG. 4a and FIG. 4b, connects the receptacle 3 to the base plate 1. The mechanism is constructed so that, when in one of its bistable states (FIG. 4a) it biases the receptacle toward the loading position shown in FIG. 2, and when in the other of its bistable states (FIG. 4b) it biases the receptacle toward the record/playback position shown in FIG. 3. The force exerted by the mechanism when the receptacle is in the record/playback position contributes toward the clamping force holding the cartridge located at the record/playback station.

Stops 13 are provided adjacent, but just beyond, the cartridge loading position on the side remote from the record/playback position. The arrangement is such that a small upward movement of the cartridge receptacle from the loading position causes the stop 13 to contact and disengage the latching mechanism 6 from the cartridge whereupon the cartridge is automatically ejected, or partially ejected, from the slot by spring pressure.

In summary therefore, an operator wishing to load a cartridge into the apparatus, first moves the operating lever 7 to the load or center position shown in FIG. 2 to open the door 27 and inserts the cartridge through the slot 4 into the receptacle 3. When the cartridge is fully inserted it is retained by the cartridge latch mechanism 6. To remove the cartridge, the operator merely raises the operating lever from the loading or center position to an upper or eject position wherein pushing the latch mechanism 6 against the stop 13 causes the cartridge to be ejected under spring pressure.

To locate a cartridge at the record/playback station, the operator inserts the cartridge and moves the operating lever 7 to its lower or play position. At some point during the downward movement of the receptacle, the toggle mechanism 12 snaps from one state (FIG. 4a) to the other (FIG. 4b) and urges the receptacle toward the record/play position and clamps it firmly in place.

At the end of the record/playback operation, the cartridge is unloaded by returning the lever 7 to the original loading or center position. At some point during the upward movement, the toggle-action mechanism snaps back to its original state (FIG. 4a) and thereafter urges the cartridge receptacle upwards toward the loading position. The combination of the operator pressure raising the level 7 and the bias exerted by the toggle-action mechanism 13 usually results in the receptacle overshooting the loading position with spontaneous release and ejection of the cartridge. Upon release of the lever, the receptacle moves to its stable loading position ready for another cartridge to be inserted. The ejection position is not a stable position.

The receptacle having two stable positions, load (center) and play (lower), plus a momentary eject (upper) position reached by overtravel when moving from the play to load position enables facile operator interaction with the playback apparatus. The cartridge is loaded into the receptacle in the load position (FIG. 1). Then, the receptacle can be moved to either the play position (FIG. 3) or in an opposite direction to eject the just inserted cartridge without ever reaching the play position. To eject the cartridge after record or playback in the play position, one motion of the receptacle to the eject position ejects the cartridge; then the receptacle returns to the load position. On the other hand, the cartridge receptacle can be moved from the play position to the load position without cartridge ejection. This action takes the record member away from the transducer, closes the cartridge and keeps the player apparatus closed by the cartridge. This latter motion is useful when the same cartridge is to be used later. Orientation of the record player is not pertinent to the successful practice of the invention.

Before describing the construction and operation of the apparatus in more detail, it is appropriate to give some details of the construction of a cartridge suitable for use with the apparatus.

Such a cartridge consists of a slim disk enclosure suitably dimensioned for insertion through the slot 4 into the receptacle 3. The cartridge contains a record disk provided with a central hub. An aperture through the cartridge is required to permit attachment of the disk hub to the motor chuck at the record/playback station in order to rotate the disk. A head aperture is also required to permit insertion of a data record/playback head at the record/playback station into the cartridge in order to perform data transducing operations on the disk. With the particular head assembly 9 used in the apparatus, the head aperture needs to be located through a major surface of the cartridge. Other head assemblies are, of course, available which would require the aperture to be located elsewhere. For example, with cartridges containing rigid disks it may be desirable to access both sides of the disk simultaneously in which case record/playback heads may be introduced into the cartridge when attached to the drive via a slot in the side of the cartridge. A detent slot is required in the cartridge to engage with the latching mechanism in the apparatus. Apertures are also required in the lower surface of the cartridge to locate on pins 10 as the cartridge is moved to the record/playback station. These holes in the cartridge are preferably shaped so as to pick up the pins 10 even though the cartridge may be slightly misaligned in the receptacle. The shape of the holes and pins are such that the cartridge is drawn in place by the receptacle as it moves to its record/playback position until it is precisely located, clamped at the record/playback station.

One form of cartridge which is particularly suitable for use in the apparatus subject of the present invention is described and claimed in U.S. Pat. No. 4,131,199. The cartridge described in this application contains a flexible record disk which in use is rotated supported by an air bearing above a stabilizing Bernoulli backing plate. The cartridge is provided with an internal spring loaded shutter which serves to close at least the head aperture when the cartridge is not in use. A small hole in the leading edge of the cartridge, with respect to the intended direction of insertion into the record/playback apparatus, permits insertion of a pin therethrough to engage the shutter and move it against the spring action to its open position. It has been found convenient in practice to mount the pin within the cartridge record/playback apparatus itself positioned so as to enter the aperture and to progressively open the shutter as the cartridge is inserted by an operator into the apparatus.

The following more detailed description of the component parts of the apparatus subject of the invention will make its operation clear. The receptacle 3 is in the form of a tray having a rectangular base 14 and raised side portions 15. The base 14 is apertured to permit access of the chuck 8 and head 11 at the record/playback station. The tray is hinged along its rear end by means of a rod 16 extending outwardly from each of the two side portions 15 and through the ends of a U- shaped bracket 17 attached to the base plate 1. Springs 18 carried by rod 16 each have their free ends attached between the tray and bracket 17 respectively to exert a force in a direction to counterbalance the weight of the cartridge receptacle.

The cartridge latch mechanism 6 consists of a multi-limbed lever 19 mounted between the sides 15 of the receptacle tray by means of pivots 20. A centrally disposed limb of the lever extends on one side of the pivotal axis and is provided with a downward projecting detent 21 at its free end. Two side limbs extending co-parallel to and co-planar with said centrally disposed limb extend on the other side of the pivotal axis and have sideways projecting lugs 22 which themselves extend into apertures 23 in the sides 15 of the receptacle tray. The dimensions of the apertures 23 are selected to maintain the extent of rocking movement of the lever 19 about its pivotal axis within pre-selected limits. Springs 24 connected between the lever 19 and tray sides 15 are bias the lever in a clockwise direction continuously urging the detent toward the cartridge receptacle 3. The two stops 13 referred to previously are conveniently provided as hooked ends of a U-shaped bracket 25 attached to the base plate 1. The dimensions of the bracket 25 are such that the hooked ends, acting as the two stops 13, contact the upper surfaces of the extending lugs 22 when the cartridge receptacle tray is in its loading position.

Since, in this particular example, the cartridge to be received by the apparatus is of the type containing a springloaded head aperture shutter, as described in our aforesaid co-pending application No. 27124/77, a pin 26 is provided toward the back of the receptacle 3, positioned to enter the cartridge during insertion thereof and to open the head aperture. The pin 26 has a shoulder which acts as a stop for the cartridge when it is fully inserted. With alternative cartridges not having such a spring loaded shutter, the pin 26 replaced by a separate spring located toward the back of the receptacle to provide the resilient bias against cartridge insertion. A separate stop for the cartridge is also provided. Since this alternative arrangement is quite clear it is not shown in the drawings.

As the cartridge is inserted into the receptacle tray 3, it contacts and lifts detent 21, rotating the latch lever 19 against the action of springs 24. The detent 21 slides along the top of the cartridge 5 as the cartridge is inserted further into the receptacle guided by side walls 15. The cartridge is aligned sufficiently accurately by its close fit between walls 15 to pick up shutter pin 26. Further insertion of the cartridge causes the shutter pin to open the spring loaded shutter in the cartridge.

This, because of its spring loading, acts against the pin to produce a resilient bias in a direction opposite to that of cartridge insertion. When the cartridge is fully inserted in the receptacle 3, the latch detent 21 drops into a corresponding detent slot 28 in the top of the cartridge retaining it within the receptacle against the resilient bias from the spring-loaded shutter.

To unload the cartridge the lever 7 is raised as previously described whereupon the stops 13 bearing on lugs 22 cause the latch lever 19 to be rotated in an anti-clockwise direction lifting the detent 21 from the cartridge detent slot 28. The cartridge is ejected under action of the resilient bias from the spring-loaded shutter acting against the pin 26. On release of the operating lever 7, the receptacle tray returns to its loading position with the lugs 22 of the spring-loaded latch lever 19 contacting the two stops 13.

Figure 4B:
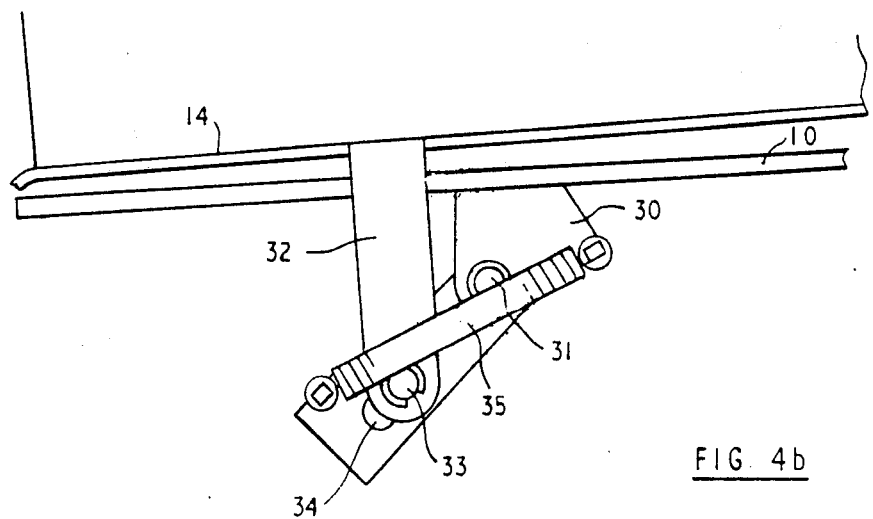
FIG. 4b shows the over-center toggle mechanism maintaining the apparatus at its closed position as shown in FIG. 3.

The toggle action spring mechanism connecting the receptacle tray 3 to the base plate 1 is shown in detail in FIG. 4a and FIG. 4b. The mechanism shown in these figures consists of an arm 29 connected at one end to a bracket 30 extending from the underside of the base plate 1 by a pivot pin 31. The arm 29 is further connected to a bracket 32 extending from the underside of the base 14 of the receptacle tray 3 by a pivot pin 33 passing through a longitudinal slot 34 in the other end of arm 29. A coil spring 35 is attached at one end to the bracket 30 and at the other end to the slotted end of arm 29.

In FIG. 2, and in detail of FIG. 4a, it is seen that the spring 35 acts so as to apply a clockwise moment to the arm 29 about pivot pin 31 thus supplying an upwards bias to the receptacle 3 to hold it in its loading position against stops 13.

In FIG. 3, and in detail in FIG. 4b, the spring 35 acts to apply an anti-clockwise moment to the arm 29 about pivot 31 biasing the tray toward its lower record/playback position. In this position, an elongated clamping bar 36 provided integral with, and directly under the pivotal axis of, the latching lever 19 contacts the upper surface of the cartridge now precisely supported on the locating pins 10 and clamps it in place at the record/playback station hard against the shoulder stop of pin 26.

The magnetic chuck 8 which engages the disk hub in the cartridge as it moves into the record/playback station is mounted on a spindle 37 extending through the base plate 1 and driven by a disk drive motor 38. The motor is itself mounted to the underside of the base plate 1. The record/playback head assembly 9 is of the pivoted type having a support arm 39 mounted for arcuate movement about an arm spindle extending through the base plate 1. The actuator arm 39 is driven by a motor 41 mounted to the underside of the base plate 1. The record/playback head 11 mounted on the free end of the arm is positioned to project into the head aperture of a cartridge when it is located at the record/playback station. The actuator assembly is positioned so that the arcuate movement of the head is in a substantially radial direction with respect to a disk at the record/playback station in order to perform data transducing operations thereon.

The present apparatus is equally usable with magnetic, optic or other forms of recording and with disk, tape, card and other forms of record members in cartridges.

While the invention has been particularly shown and described with reference to a preferred embodiment thereof, it will be understood by those skilled in the art that various changes in form and details may be made therein without departing from the spirit and scope of the invention.

What is claimed is:

1. A cartridge type record player having a transducer mounted on a frame, a cartridge receptacle movably mounted on said frame and adapted to movably receive a record containing cartridge, the improvement including in combination:

bistable spring urged means coupled between said receptacle and said frame for yieldably holding said receptacle in a center load position remote from said transducer or in a play position adjacent said transducer for enabling movements therebetween, overtravel stop means on said frame and spaced from said load position in a direction away from said play position to define an eject position, and ejection means locking said cartridge in said receptacle in said center and play positions and responsive to contact with said overtravel stop means to release said cartridge for ejection from said receptacle.

2. The record player set forth in claim 1 further including in combination, pivot means on said frame pivotally mounting said receptacle for pivoting motions between said positions about a pivot axis, said ejection means including a locking bar having a locking end portion lockingly engageable with a cartridge in said receptacle and pivoted on said receptacle about an axis substantially parallel to said pivot axis whereby pivoting motion of said receptacle from said center position away from said play position actuates said ejection means to pivot said locking bar end portion away from said cartridge to release same.

3. The record player set forth in claims 1 or 2 wherein said record member is a magnetic storage disk and said cartridge being plate-like and having a latch recess, said receptacle being plate-like for slideably receiving said cartridge when in said center position, and said ejection means having a catch facing said receptacle for engaging a receptacle received cartridge in said latch recess whenever said receptacle is in either said center or play positions and for being disengaged from such receptacle received cartridge when said receptacle is in said eject position.

4. A record player having a pivoted cartridge receiving receptacle for receiving and holding a record-containing cartridge, a transducer for exchanging signals with a record in a received cartridge, means connected to said receptacle for yieldably keeping said receptacle in one of two stable positions, one position being a center position and a second position being a play position and including means enabling movement from said center position away from said play position, and cartridge latch means on said receptacle for latching a cartridge to said receptacle when said receptacle is in either said play or center position and responsive to said enabled movement away from said center and play positions to release said cartridge for ejection.

5. A record player having a frame, transducer means mounted on said frame, a record-cartridge carrying receptacle movably mounted on said frame for movements toward and away from said transducer means in a plurality of stabilized positions, one of said stabilized positions being a play position immediately adjacent said transducer means, another of said stabilized positions being a load position remote from said transducer means, means enabling movement of said receptacle to an unload enable position further away from said transducer means than said load position, means securing a received cartridge to said receptacle in said stabilized positions whenever such received cartridge is inserted therein in a predetermined location, and release means operative when said receptacle is in said unload position to release said securing means to allow movement of said received cartridge from said predetermined location.

6. The record player set forth in claim 5 wherein said securing means is mounted on said receptacle and said release means being a stop member mounted on said frame for engagement with said receiving means for releasing same from said received cartridge as said receptacle moves to said unload enable position.

7. The record player set forth in claim 6 wherein said cartridge has a latch recess and said securing means is a bar member pivoted on said receptacle and having a latch means on one side of such pivot for engagement with said cartridge in said latch recess and a release end potion extending from said pivot opposite from said latch means, and said stop member being aligned with said release end portion for engagement therewith.

8. The method of operating a cartridge player having a movable cartridge receptacle and a transducer for exchanging signals with a record carried by said cartridge, the steps of:

stably holding said receptacle in a center position for receiving and retaining a cartridge in said receptacle, selectively moving said receptacle from said center position and for return to said center position, in one of two opposing directions, moving said receptacle in a first direction to a play position including stably holding said cartridge in said second position for enabling transducing operations by said transducer on said record, and moving said receptacle in a section direction from said center position opposite to said first direction to a third position and ejecting said cartridge from said receptacle when in said third position.

* * * * *